United States Patent
Chihara et al.

(10) Patent No.: US 11,244,159 B2
(45) Date of Patent: Feb. 8, 2022

(54) ARTICLE RECOGNITION SYSTEM AND ARTICLE RECOGNITION METHOD

(71) Applicant: Hitachi, Ltd., Tokyo (JP)

(72) Inventors: Nobuhiro Chihara, Tokyo (JP); Takaomi Nishigaito, Tokyo (JP); Nobutaka Kimura, Tokyo (JP); Taiki Yano, Tokyo (JP); Fumiko Beniyama, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 77 days.

(21) Appl. No.: 16/851,647

(22) Filed: Apr. 17, 2020

(65) Prior Publication Data

US 2020/0342224 A1    Oct. 29, 2020

(30) Foreign Application Priority Data

Apr. 24, 2019 (JP) .............................. JP2019-082646

(51) Int. Cl.
| | |
|---|---|
| *G06K 9/00* | (2006.01) |
| *G06K 9/20* | (2006.01) |
| *G06K 9/44* | (2006.01) |
| *G06K 9/46* | (2006.01) |
| *G06K 9/62* | (2006.01) |
| *G08B 21/18* | (2006.01) |

(52) U.S. Cl.
CPC ........... *G06K 9/00624* (2013.01); *G06K 9/20* (2013.01); *G06K 9/44* (2013.01); *G06K 9/46* (2013.01); *G06K 9/6202* (2013.01); *G08B 21/182* (2013.01)

(58) Field of Classification Search
None
See application file for complete search history.

(56) References Cited

U.S. PATENT DOCUMENTS

| | | | |
|---|---|---|---|
| 10,740,891 B1* | 8/2020 | Chen | G06T 7/001 |
| 2019/0205694 A1* | 7/2019 | Wang | G06K 9/00288 |
| 2019/0294672 A1* | 9/2019 | Matskevich | G06F 40/268 |
| 2020/0202168 A1* | 6/2020 | Mao | G06K 9/6857 |

FOREIGN PATENT DOCUMENTS

| | | | | |
|---|---|---|---|---|
| CN | 105931276 A | * | 9/2016 | |
| CN | 108229515 A | * | 6/2018 | |
| CN | 108875725 A | * | 11/2018 | |
| JP | 2001-272994 A | | 10/2001 | |
| JP | 2013-238953 A | | 11/2013 | |
| WO | WO-2019085793 A1 | * | 5/2019 | G06K 9/6271 |

* cited by examiner

*Primary Examiner* — Mohammed Rachedine
(74) *Attorney, Agent, or Firm* — Crowell & Moring LLP

(57) ABSTRACT

A technology capable of dealing with a variation in appropriate recognition parameters due to a change in work environment at a work site at a time of recognizing an article in an image. An article recognition system includes: an input section to which a captured image is input; an output section that presents information to a user; a storage section that stores master data defining features of an object to be recognized; a recognition section that detects the object to be recognized in the image; and a recognition evaluation section that evaluates a recognition content of the recognition section and that presents an alert to the output section on the basis of an evaluation result.

12 Claims, 8 Drawing Sheets

FIG.8

TRIAL SEQUENCE SETTING

| TRIAL PARAMETER 801 | TRIAL RANGE 802 | TRIAL GRANULARITY 803 |
|---|---|---|
| EXPOSURE TIME ▽ | ±1sec ▽ | 100 ▽ |
| RANSAC THRESHOLD ▽ | ±100 ▽ | 10 ▽ |
| ▽ | | |

PREDICTED TRIAL TIME 804

1 MIN. 30 SEC.

ARTICLE RECOGNITION SYSTEM AND ARTICLE RECOGNITION METHOD

BACKGROUND OF THE INVENTION

1. Field of the Invention

The present invention relates to a technology for recognizing an article in an image.

2. Description of the Related Art

To realize automation of article picking work, the development of a technology for recognizing an article of interest in a captured image is underway. Such a technology is useful at a time of article sorting by a robot at, for example, a physical distribution site, and improved recognition accuracy is demanded.

In a case of recognizing an article in a captured image, it is estimated that a brightness condition and the like vary depending on a change in surrounding environment during operation. Various types of changes such as a change in season, a change in placement of surrounding equipment, and a change in illumination are conceivable as the change in surrounding environment.

When an optimal value of a recognition parameter changes with the change in surrounding environment and a recognition failure occurs as a result of the change, problems occur that inadequate work is conducted and work is stopped. The adjustment of the recognition parameter is known in JP-A-2001-272994 and JP-A-2013-238953.

A configuration disclosed in JP-A-2001-272994 has optimal parameter adjustment amount calculating means for calculating an optimal parameter adjustment amount of a recognition model so that the recognition model reaches a local optimal state in an early phase, and adjusting means for adjusting parameters of the model by the optimal parameter adjustment amount calculated by the optimal parameter adjustment amount calculating means.

According to a technology disclosed in JP-A-2013-238953, a parameter adjustment section determines first to n-th parameter values for converting a learning image in order to stably generate many local feature amounts. An image conversion section generates first to n-th conversion images by converting the learning image using the first to n-th parameter values. A local feature amount extraction section identifies feature areas in the first to n-th conversion images and extracts local feature amounts from the feature areas. A cluster generation section generates clusters available as recognition data by clustering the local feature amounts.

SUMMARY OF THE INVENTION

According to a technology disclosed in JP-A-2001-272994, recognition parameters are completely automatically calculated. At an actual site, however, a countless number of factors are considered to be involved in the change in surrounding environment. It is, therefore, difficult to obtain optimal parameters completely automatically to follow up the change in surrounding environment.

The technology disclosed in JP-A-2013-238953 is not achieved without listing variation factors of the image in a learning phase. Actual factors of environmental variation are myriad and, therefore, difficult to comprehend completely in advance.

An object of the present invention is to provide a technology capable of dealing with a variation in appropriate recognition parameters due to a change in work environment at a work site at a time of recognizing an article in an image.

According to one favorable aspect of the present invention, an article recognition system includes: an input section to which a captured image is input; an output section that presents information to a user; a storage section that stores master data defining features of an object to be recognized; a recognition section that detects the object to be recognized in the image on the basis of information extracted from the image and the master data; and a recognition evaluation section that evaluates a recognition content of the recognition section and that presents an alert to the output section on the basis of an evaluation result.

Examples of an object to be evaluated in the recognition content include the number of extracted feature points in the image, the number of matching points between the feature points in the master data and the feature points in the image, and the degree of collation. The degree of collation is calculated by, for example, performing a process for estimating a posture of the object to be recognized in the image, and eliminates feature points of the object to be recognized in the image if the feature points are apart in position from corresponding feature points of the master data by a predetermined distance or longer, and calculates the degree of collation on the basis of the number of correspondent points that are the feature points remaining after elimination.

Furthermore, as a more specific example, it can be determined whether to present the alert by comparison of the object to be evaluated and a preset threshold. As the threshold for use in determining whether to present the alert, a threshold greater than a threshold for use in determining whether to stop the system.

Moreover, as another specific example, the article recognition system further includes a parameter adjustment section, and the recognition evaluation section evaluates the recognition content of the recognition section, and presents the alert to the output section and instructs the parameter adjustment section to make parameter adjustment on the basis of the evaluation result. The parameter adjustment section changes at least one of an image capturing parameter for capturing the image, an image processing parameter for processing the captured image, and a parameter used in a process performed by the recognition section, and performs a trial sequence for causing the recognition section to detect the object to be recognized in the image using the changed parameter, and for causing the recognition evaluation section to evaluate the recognition content of the recognition section. The parameter adjustment section then presents a change parameter candidate on the basis of an evaluation result of the recognition content by the recognition evaluation section.

According to another favorable aspect of the present invention, an article recognition method is a method for storing features and placement of an object to be recognized as master data and detecting the object to be recognized in an image. This method includes: a first step of inputting a captured image of an article; a second step of extracting features from the image and detecting an article corresponding to the features and the placement of the master data at a degree of collation equal to or higher than a predetermined value from the image; a third step of determining whether the degree of collation is below a stop threshold in the second step; a fourth step of determining whether the degree of collation is below an alert threshold greater than the stop threshold in the second step; a fifth step of changing a parameter used in the second step and trying the second step in a case in which it is determined in the fourth step that the degree of collation is below the alert threshold; a sixth step of evaluating the degree of collation as a result of trying the second step by the fifth step; and a seventh step of presenting an evaluation result by the sixth step to a user.

In a specific embodiment, the first to fourth steps are executed continuously unless it is determined in the third step that the degree of collation is below the stop threshold, and the fifth to seventh steps are executed in a background of the first to fourth steps.

It is possible to provide a technology capable of dealing with a variation in appropriate recognition parameters due to a change in work environment at a work site at a time of recognizing an article in an image. Specific problems other than the problem described above, specific configurations, and advantages will be readily apparent from the description of embodiments given below.

BRIEF DESCRIPTION OF THE DRAWINGS

FIG. 8 is a schematic diagram depicting an example of a trial sequence setting screen in the initial setting of the article recognition system.

DESCRIPTION OF THE PREFERRED EMBODIMENTS

Figure 1:
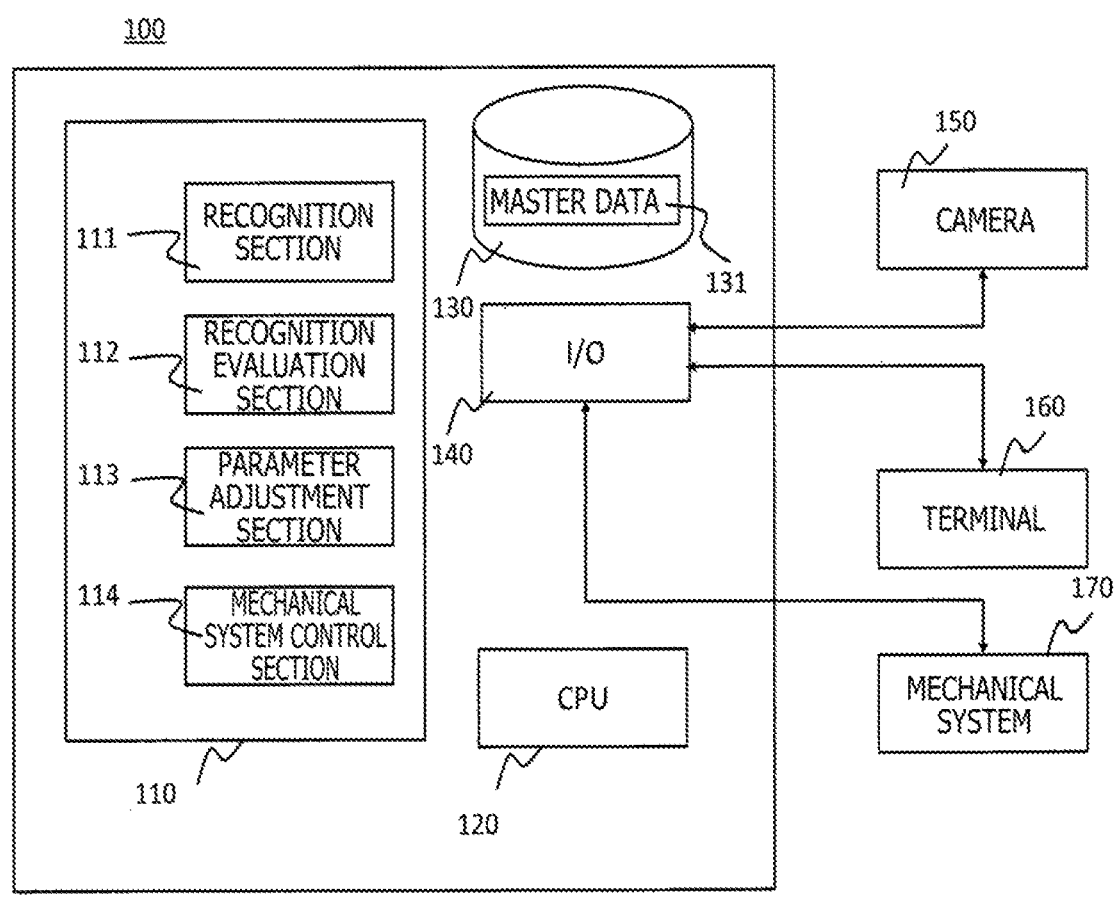
FIG. 1 is a block diagram depicting an example of a configuration of an article recognition system according to an embodiment.

Embodiments will be described in detail with reference to the drawings. It is to be noted, however, that interpretation of the present invention is not limited to that of contents described in the embodiments given below. A person skilled in the art could easily understand that a specific configuration of the present invention can be changed without departure from an idea or intent of the present invention.

In the configuration of the invention to be described below, identical reference characters are used to denote identical parts or parts having similar functions commonly among different drawings and repetitive description therefor will be often omitted.

In a case in which a plurality of constituent elements have an identical or similar function, the constituent elements are often described while the same reference character with a different character added denotes each constituent element. It is noted, however, in a case of no need to distinguish these constituent elements, the constituent elements are often described with the additional characters omitted.

In the present specification and the like, designations such as "first," "second," and "third" are added to identify each constituent element and do not necessarily limit the number, an order, or contents thereof. Furthermore, a number for identifying each constituent element is employed on context by context basis and the number used in one context does not always denote an identical configuration in other contexts. Moreover, the number is not intended to inhibit a constituent element identified by a certain number from sharing a function of a constituent element identified by the other number.

A position, a magnitude, a shape, a range, and the like of each configuration illustrated in the drawings and the like do not often represent an actual position, an actual magnitude, an actual shape, an actual range, and the like for facilitating understanding the invention. For this reason, the present invention is not always limited to the positions, the magnitudes, the shapes, the ranges, and the like disclosed in the drawings and the like.

All the publications, patents, and patent applications cited in the present specification are incorporated into the present specification by referring thereto.

It is assumed that a constituent element represented singularly in the present specification include plural unless specified otherwise in context.

According to studies by the inventors, in a case of dealing with an optimal value of a recognition parameter varying with a change in work environment, elements that can be determined only at an operation site are involved, and it is, therefore, necessary to make dynamic change of the optimal value in an operational phase. As a specific configuration to satisfy the need, the inventors considered that it was desirable to notify a user of a warning and to give the user an opportunity of selecting the parameter at the operation site.

In an example of an article recognition technology described in the embodiments, a degree of collation and the number of matching points between a master and a captured image are calculated, and the user is notified of an alert and encouraged to reset a recognition parameter when the degree of collation and the number of matching points are below each threshold. Setting the threshold to a value that avoids a failure in recognition makes it possible adjustment before the system comes to a stop.

First Embodiment

<1. System Configuration>

FIG. 1 is a block diagram depicting an example of a configuration of an article recognition system according to a first embodiment. The article recognition system includes an information processing apparatus 100 configured by an ordinary server or the like, a camera 150 that captures an image of an article, and a terminal 160 operated by a user.

The information processing apparatus 100 includes a memory 110, a processor (Central Processing Unit (CPU)) 120, a storage device 130, and an input/output interface 140. The information processing apparatus 100 may have other configurations of the ordinary server. The memory 110 can be configured with an ordinary semiconductor memory, and the storage device 130 can be configured with a magnetic disk or the like. It is noted that the sections of the information processing apparatus 100 are connected to one another by a bus that is not depicted and can transmit and receive information to and from one another.

In the present embodiment, functions of calculation, control, and the like are realized by causing the processor 120 to execute software stored in the memory 110 and performing specified processes to work with other hardware. The software executed by the information processing apparatus 100, a function of the software, or means for realizing the function is often described using "section," "module," or the like.

The memory 110 includes a recognition section 111 that is software for recognizing an article, a recognition evaluation section 112 that is software for evaluating a recognition result, and a parameter adjustment section 113 that is software for adjusting a parameter related to recognition.

An image of an article to be recognized (not depicted) is captured by a camera 150 such as a video camera, and the captured image is input to the recognition section 111 via the input/output interface 140. The input/output interface 140 may be configured such that an input section and an output section are provided independently.

The recognition section 111 recognizes an article in the captured image in accordance with an algorithm for recognition. At the time of recognition, master data 131 stored in the storage device 130 is read out and used by the memory 110.

A well-known technology can be used for the algorithm for recognition. In general, features and placement of an article of interest are obtained from an image of the article of interest and stored as the master data 131 in advance. Specific examples include placement of each feature point and a feature amount corresponding to the feature point. Feature points are extracted from the captured image, the feature amounts corresponding to the feature points are calculated, and matching in feature point and feature amount is carried out between the captured image and the master data 131. The article in the image is recognized on the basis of a matching result.

It is noted herein that a state of the captured image varies with a change in work environment and it is often difficult to perform an appropriate recognition process. In such a case, it is necessary to change a parameter for the recognition process to an appropriate value. The present embodiment provides a technology capable of setting an optimal parameter at a work site.

The configuration of the information processing apparatus 100 described above may be configured by a single server, or arbitrary sections such as an input device, an output device, the processor, and the storage device may be configured by the other server connected to the information processing apparatus 100 via a network.

In the present embodiment, equivalent functions to the functions configured by the software can be also realized by hardware such as Field Programmable Gate Array (FPGA), Application Specific Integrated Circuit (ASIC), or the like. Such an aspect is contained in the scope of the present invention.

The article recognized by the recognition process is mechanically operated by, for example, a picking process. The article recognition system includes a mechanical system control section 114 for mechanically operating the article. The mechanical system control section 114 controls an action of a mechanical system. 170 via the input/output interface 140. Examples of the mechanical system 170 include a robot arm and various kinds of machine tools. It is noted that the information processing apparatus 100 can be connected to the camera 150, the terminal 160, and the mechanical system 170 by either wired connection or wireless connection.

<2. Process Flow>

Figure 2:
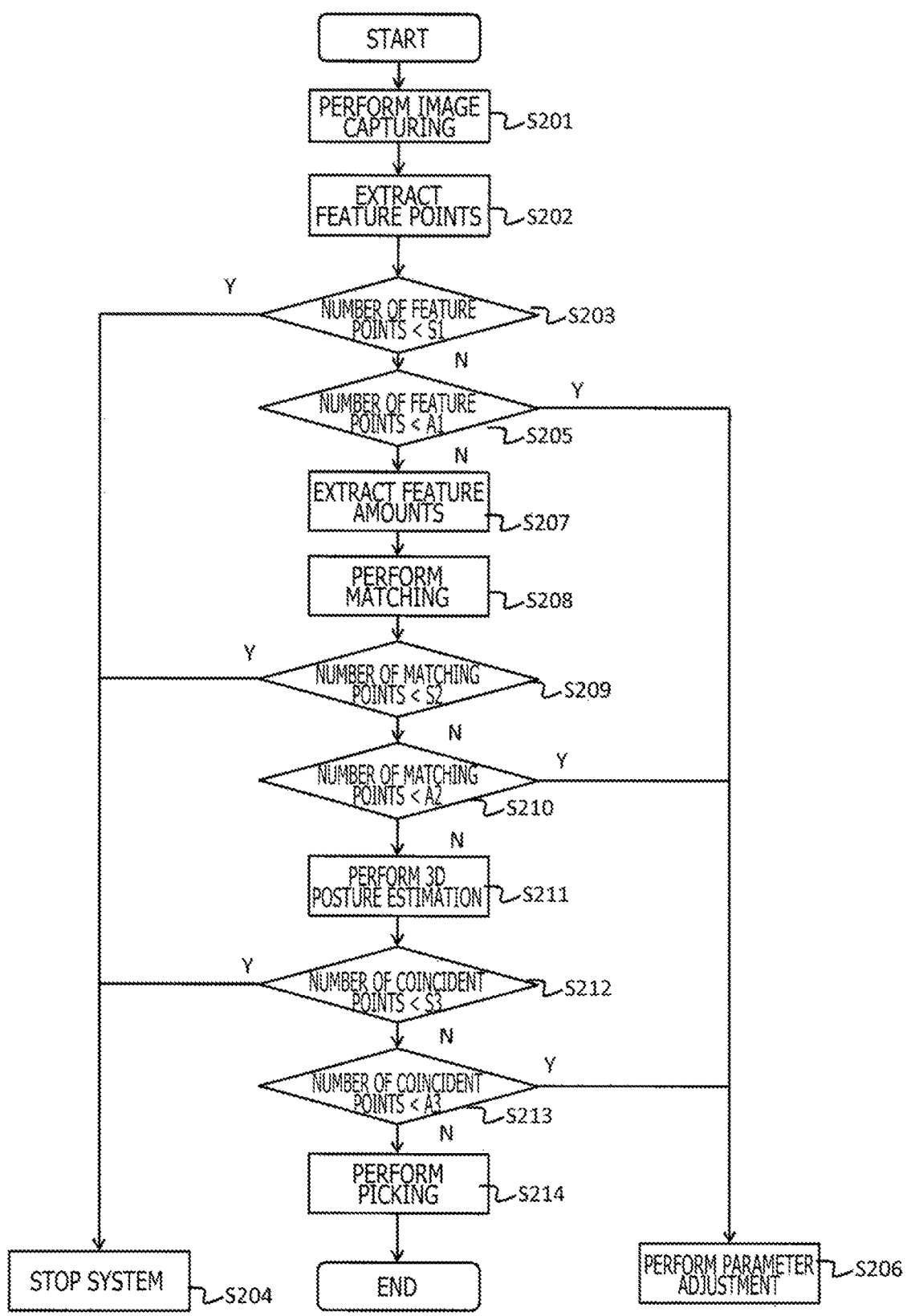
FIG. 2 is a flowchart depicting a recognition process by the article recognition system according to the embodiment.

FIG. 2 is a flowchart depicting the recognition process by the article recognition system according to the embodiment. The present embodiment illustrates an example of recognizing an article and mechanically picking the recognized article.

First, the camera 150 performs an image capturing process S201 for capturing an image of an area where the article of interest is estimated to be present. The captured image is transmitted to the recognition section 111. The camera 150 may capture, for example, a predetermined fixed range, or the camera 150 may be disposed on a tip end of the robot arm to change a visual field of the camera 150 in proportion to movement of the robot arm.

The recognition section 111 performs detection for extracting feature points from the captured image and description for expressing areas corresponding to the feature points. These processes are well-known. While examples of a method of detecting the feature points include a method of extracting points that form edges by differential processing, a method of extracting corners using a method such as Harris corner Detection or the like, and a method of extracting areas of the same color and setting centers of the areas as positions of the feature points, the method is not limited to a specific method.

As for a method of expressing the feature amounts, a technology for extracting local image feature amounts such as Scale-Invariant Feature Transform (SIFT) and Histograms of Oriented Gradients (HoG), a technology for extracting three-dimensional feature amounts such as Signature of Histograms of Orientations (SHOT), and the like are known. While there are other well-known feature amount expression methods, the expression method is not limited to those described above in the present embodiment.

In a case of extracting feature amounts by SIFT, for example, scales and positions of feature points are extracted by a Difference of Gaussian (DoG) process, an orientation is obtained from gradient information in the scales, and feature amounts are described by rotating a space in an orientation direction. Furthermore, matching is performed between the feature points and the feature amounts of the article of interest stored in advance and those of the captured image, thereby recognizing an object.

In the present embodiment, the recognition section 111 performs first a feature point extraction process S202 for extracting feature points, and the recognition evaluation section 112 determines whether sufficient feature points are detected from the image.

The number of feature points is determined in two stages. In a determination process S203 for determining the number of feature points, the recognition section 111 determines whether the number of feature points is below a threshold S1. In a case in which the number of feature points is below the threshold S1, the recognition section 111 stops the system (S204). It is noted, however, that the threshold S1 is preferably set not to a level at which recognition is promptly disabled but set to a level with a predetermined margin.

In a case in which the number of feature points is equal to or greater than the threshold S1, the recognition section 111 determines whether the number of feature points is below a threshold A1 (S205). The threshold A1 is set greater than the threshold S1, and is used to determine that the object can be appropriately recognized under present circumstances but that it is necessary to stop the system when the number of feature points is below the threshold A1. In a case in which the number of feature points is below the threshold A1, the parameter adjustment section 113 performs parameter adjustment S206. The parameter adjustment will be described later in detail.

In a case in which a sufficient number of feature points are extracted, the recognition section 111 calculates a feature amount corresponding to each feature point (S207). Subsequently, the recognition section 111 performs matching S208 between the feature amounts of the master data 131 and those of the captured image and causes each matching feature amount of the master data 131 to correspond to the feature amount of the captured image.

The recognition evaluation section 112 determines whether sufficient matching is executed for a matching result. The number of matching points is determined in two stages. In a determination process S209 for determining the number of matching points, the recognition section 111 determines whether the number of matching points is below a threshold S2. In a case in which the number of matching points is below the threshold S2, the recognition section 111 stops the system (S204). It is noted, however, that the threshold S2 is preferably set not to a level at which recognition is promptly disabled but set to a level with a predetermined margin.

In a case in which the number of matching points is equal to or greater than the threshold S2, the recognition evaluation section 112 determines whether the number of matching points is below a threshold A2 (S210). The threshold A2 is set greater than the threshold S2, and is used to determine that the object can be appropriately recognized under present circumstances but that it is necessary to stop the system when the number of matching points is below the threshold A2. In a case in which the number of matching points is below the threshold A2, the parameter adjustment section 113 performs parameter adjustment S206. The parameter adjustment will be described later in detail.

In a case in which a sufficient number of matching points are extracted, the recognition section 111 performs a process for estimating a three-dimensional posture of the article in the image and performs matching between the feature points and the feature amounts of the master data 131 and those of the captured image (S211). The recognition section 111 adapts herein the posture of the article in the image to a posture of the master data 131 in such a manner that the position of each feature amount of the article in the image are coincident with the position of each feature amounts of the master data 131. The recognition section 111 eliminates feature points and feature amounts of the article in the image if the feature points and the feature amounts are apart in position from the corresponding feature points and the corresponding feature amounts of the master data 131 by a predetermined distance or longer using a Random Sample Consensus (RANSAC) algorithm or the like. The recognition section 111 determines a total number of feature points remaining after elimination as the number of coincident points. It is noted that a numeric value calculated on the basis of the coincident points is often referred to as a "degree of collation" in the present specification.

The recognition evaluation section 112 determines whether a sufficient number of coincident points are obtained for the matching result. The number of coincident points are determined in two stages. In a determination process (S212) for determining the number of coincident points, the recognition evaluation section 112 determines whether the number of coincident points is below a threshold S3.

In a case in which the number of coincident points is below the threshold S3, the recognition evaluation section 112 stops the system (S204). It is noted, however, that the threshold S3 is preferably set not to a level at which recognition is promptly disabled but set to a level with a predetermined margin.

In a case in which the number of coincident points is equal to or greater than the threshold S3, the recognition evaluation section 112 determines whether the number of coincident points is below a threshold A3. The threshold A3 is set greater than the threshold S3, and is used to determine that it is necessary to stop the system when the number of coincident points is below the threshold A3. In a case in which the number of coincident points is below the threshold A3, the parameter adjustment section 113 performs parameter adjustment S206. The parameter adjustment will be described later in detail.

When recognition is normally finished, the mechanical system control section 114 in the system instructs the mechanical system 170, which is, for example, the robot arm, to pick the article (S214). Upon finishing one picking action, the system repeats the next image capturing process S201 and the following processes and performs next picking.

In the flow described above, three parts where the recognition evaluation section 112 performs checking are provided. The three parts include (1) a part to determine whether the number of extracted feature points is sufficient (S203 and S205), (2) a part to determine whether the number of matching points is sufficient (S209 and S210), and (3) a part to determine whether a remaining number (degree of collation) obtained by adapting the posture of the article in the image to the posture of the master data 131 and eliminating the deviating feature amounts (S213 and S214). It is to be noted, however, the present invention may be carried out while omitting one or two out of (1) to (3) as a modification of the present embodiment. Furthermore, the thresholds may be each a threshold that represents an absolute value or a threshold that represents a relative value, for example, a ratio of the number to a reference number.

<3. Parameter Adjustment>

The parameter adjustment is executed by the parameter adjustment section 113.

<3-1. Parameters to be Adjusted>

The following parameters are considered to be adjustable parameters in the present embodiment. Needless to say, it is not always necessary to adjust all of these parameters. Furthermore, parameters other than these parameters can be adjusted together with these parameters. As described later with reference to FIG. 8, an operator may select parameters to be adjusted from the terminal 160 in advance.

Examples of the parameters in the image capturing process S201 include a shutter speed, exposure time, a resolution, a frame rate of the camera 201. In addition, examples of the parameters in an image process after the image capturing process S201 or those in an image process as a preprocess of the feature point extraction process S202 include an image compression ratio, a brightness correction parameter, a color correction parameter, a contrast correction parameter, and parameters for various filters (filters for edge enhancement, smoothing, and the like).

Examples of the parameters used in the feature point extraction process S202 include a parameter for a feature point extraction algorithm.

Examples of the parameters associated with the feature amount extraction S207 and the matching S208 include a parameter in feature amount calculation, a parameter in a matching process, and a weight parameter for a plurality of feature amounts at a time of simultaneously using the plurality of feature amounts.

Examples of the parameters associated with the three-dimensional posture estimation S211 include a parameter for a positioning algorithm and a parameter for the RANSAC algorithm (for example, an allowable error threshold indicating how much each feature point deviates on the basis of which the feature point is eliminated).

<3-2. Parameter Adjustment Flow>

Figure 3:
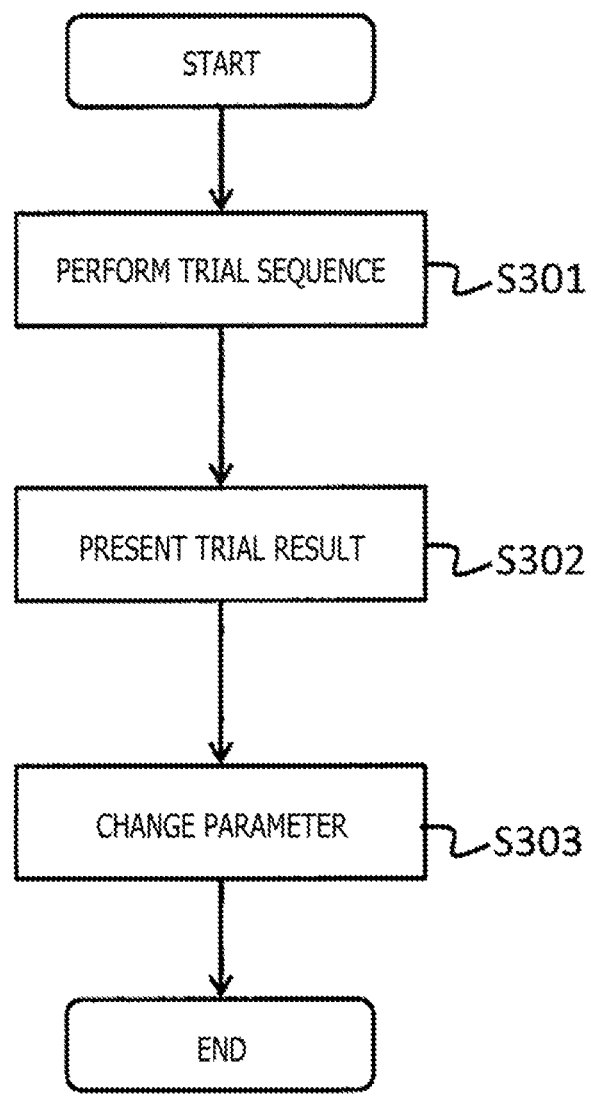
FIG. 3 is a flowchart for a parameter adjustment process executed by a parameter adjustment section.

FIG. 3 depicts a flow of performing a parameter adjustment process executed by the parameter adjustment section 113. In a case in which a determination result branches off to YES in any of steps S205, 210, and S213 of FIG. 2, the parameter adjustment S206 is started. It is noted that this branch is often referred to as "alert," hereinafter.

In a case of generation of an alert, the parameter adjustment section 113 displays the alert on the terminal 160 in real time and performs a process for calling the operator (worker). While a method of calling the operator is not limited to a specific method, examples of the method include a warning by a sound or an image on the site and a notification of a mobile terminal carried by the operator of the alert. The operator receiving the call heads for a location of the terminal 160 for confirmation and the process. The article recognition system executes the flow of the parameter adjustment S206 simultaneously with and in parallel to the display and the like. It is noted that the article recognition system continues to perform ordinary processes unless the system reaches a state of system stopping S204 even when the alert is generated.

The parameter adjustment section 113 performs a trial sequence S301 for changing the parameter in a predetermined pattern in response to the alert, capturing an image of the articles and recognizing the article, and recording an evaluation result for recognition.

Upon completion with a series of the trial sequence, the evaluation result is presented to the terminal 160 to wait for an operator's response (S302).

The operator confirms the evaluation result presented on the terminal 160, and changes the parameter as needed by operating the terminal 160 (S303). After changing the parameter for the camera 150 or the recognition section 111, the article recognition system continues processes using the parameter.

<3-3. Trial Sequence>

Figure 4:
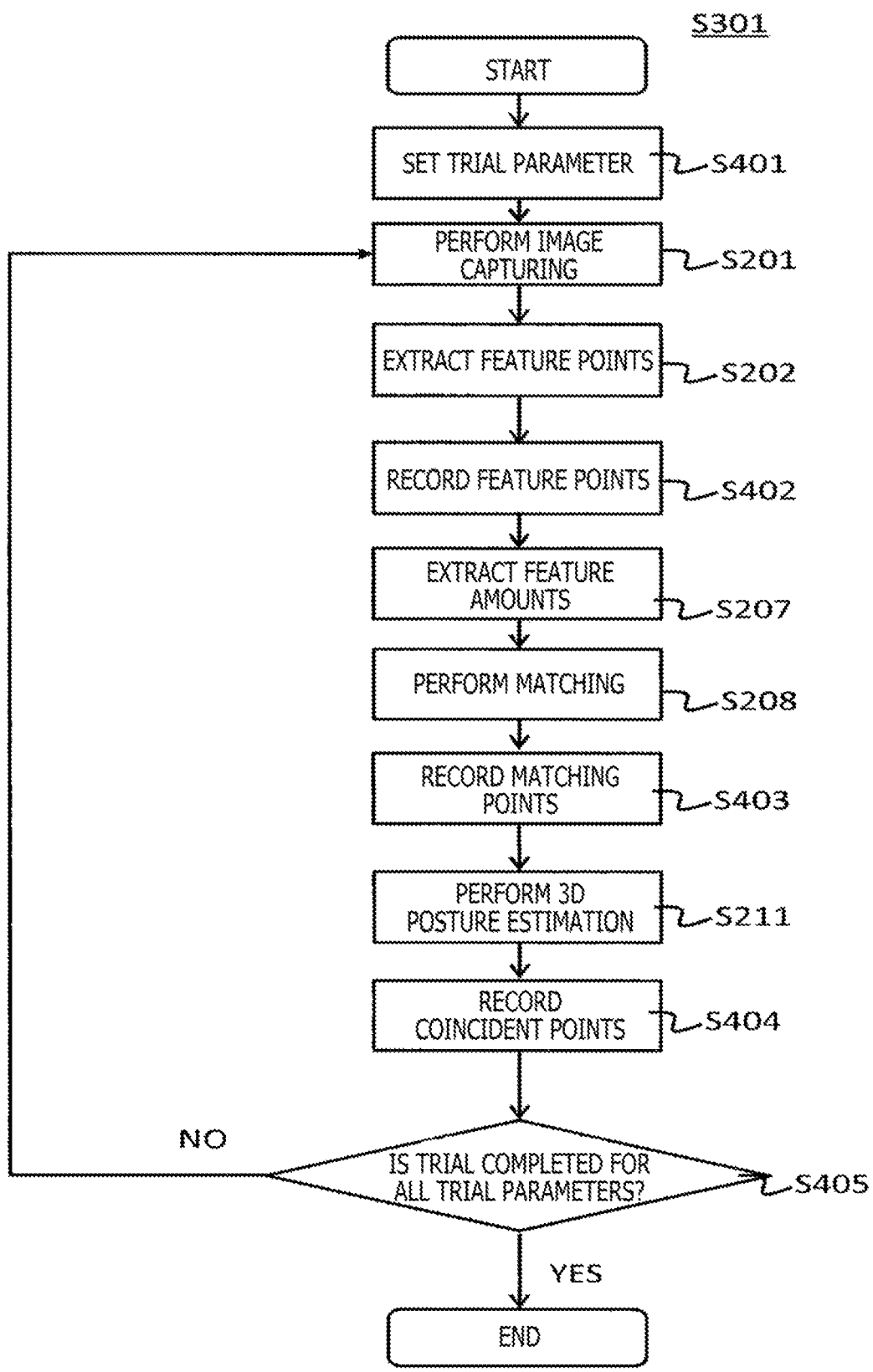
FIG. 4 is a flowchart depicting a specific example of a trial sequence.

FIG. 4 is a flowchart depicting a specific example of the trial sequence S301. In the trial sequence, the article recognition system recognizes the article by changing the parameter, and evaluates a recognition result. Recognition and recognition evaluation processes are basically similar to those in FIG. 2, and similar processes are denoted by the same reference characters.

In the trial sequence S301, however, the article recognition system performs a process S402 for recording the number of extracted feature points after the feature point extraction process S202. Furthermore, the article recognition system performs a process S403 for recording the number of matching points after the matching S208. Moreover, the article recognition system performs a process S404 for recording the number of coincident points after the three-dimensional posture estimation S211. Recorded data is recorded, together with the corresponding parameter, in the memory 110 or the storage device 130 and then displayed on the terminal 160.

In trial parameter setting S401, the article recognition system sets a parameter by a prescribed method for a recognition process to be tried. In a case in which a plurality of parameters are present, the article recognition system tries the recognition process for a plurality of combinations of parameters by changing the parameters. A parameter setting method can be set by the operator on the terminal 160 in advance. The parameter setting method will be described later with reference to FIG. 8.

The article recognition system determines whether the trial of the recognition process is completed for all the set parameters (S405) and ends the trial sequence S301 in a case in which the trial is completed for all the set parameters. It is noted that the article recognition system returns to the image capturing process S201 after determining YES in Step S405 in a processing loop of FIG. 4. However, in a case of not changing the parameter for the image capturing process, the article recognition system may repeat the feature point extraction process S202 and the following processes using the current image.

Figure 5:
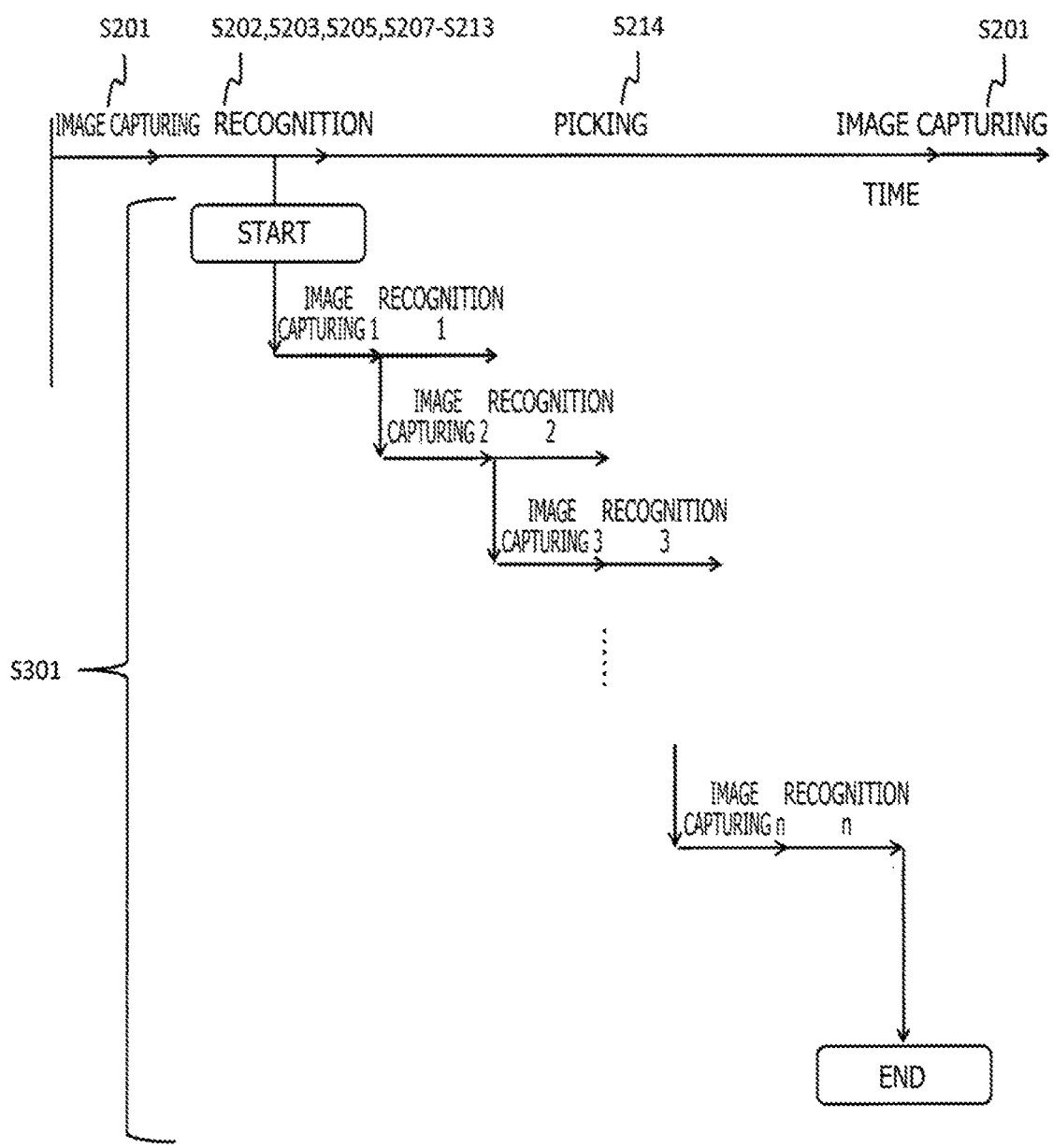
FIG. 5 is an explanatory schematic diagram of a concept of the trial sequence.

FIG. 5 is an explanatory schematic diagram of a concept of the trial sequence S301. In FIG. 5, a horizontal axis indicates time, and the image capturing process S201, the recognition processes S202, S203, S205, and S207 to S213, and the picking process S214 as the ordinary recognition process are sequentially executed to correspond to FIG. 2. In a case of generation of the branch (alert) to the parameter adjustment S206 in the middle of the recognition, the trial sequence S301 is started.

As depicted in FIG. 5, the article recognition system can execute the trial sequence S301 in a background of the ordinary recognition process. It takes time for the picking process S214 that is a mechanical operation 100 to 1,000 times as long as time of the image capturing and recognition processes. Owing to this, it is possible to make n-pattern trials using the time of the picking process S214, as depicted in FIG. 5.

<3-4. Trial Result Presentation and Parameter Selection>

Reference is made back to FIG. 3. When the trial sequence S301 is over, the parameter adjustment section 113 performs a trial result presentation process S302 and a parameter change process S303.

Figure 6:
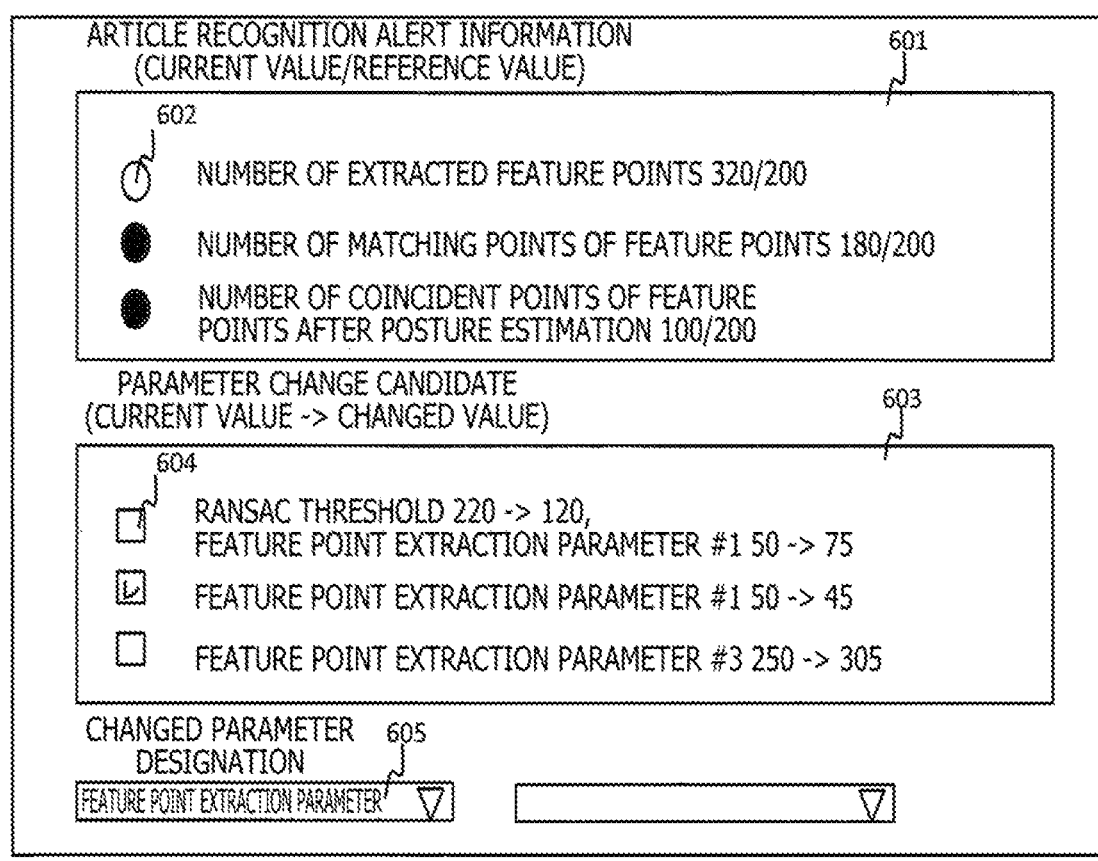
FIG. 6 is a schematic diagram depicting an example of information displayed on a display screen of a terminal.

FIG. 6 depicts an example of a result of the trial result presentation process S302 and information displayed on a display screen (monitor screen) of the terminal 160. The parameter adjustment section 113 displays the result on the terminal 160 on the basis of data recorded in the process S402 for recording the number of feature points, the process S403 for recording the number of matching points, and the process S404 for recording the number of coincident points after end of the trial sequence S301.

In an area 601 of FIG. 6, which of the three determination processes of FIG. 2, that is, the process for determining the number of extracted feature points (S205), the process for determining the number of matching points of the feature amounts (S210), and the process for determining the remaining number after eliminating the deviating feature amounts (S214) the alert is generated is displayed as article recognition alert information. In the example of FIG. 6, indicators 602 indicate that the alert is generated in relation to the number of matching points of the feature amounts (S210) and the remaining number after eliminating the deviating feature amounts (S214). At the same time, current values and reference values (thresholds) are displayed.

Through the trial sequence described with reference to FIG. 4, pieces of data about the obtained number of feature points, the obtained number of matching points, and the obtained number of coincident points are stored in the memory 110 or the storage device 130 in such a manner as to be associated with one another per changed parameter condition. Since it is normally complicated to display results of all parameter conditions used for the trial, the parameter adjustment section 113 desirably adopts a method including, for example, adding a record to each trial result in accordance with a predetermined algorithm, and displaying the trial results in order of records.

In the example of FIG. 6, parameter change candidates are depicted in an area 603 in order of records. A type, a current value, and a changed value of each parameter are displayed for each parameter change candidate. Furthermore, the number of extracted feature points, the number of matching points of the feature points, and the number of coincident points of the feature points after posture estimation may be able to be displayed per parameter change candidate although not depicted in FIG. 6. The operator can select an arbitrary candidate from among the displayed candidates by, for example, checking any of boxes 604 using a pointing device or the like.

Information displayed in the area 601 and associated with which of the determinations the alert is generated often gives a skilled operator a hint of parameter change. Therefore, the operator can narrow down the parameters to be changed and display the parameters as the parameter change candidates in the area 603 on the basis of the article recognition alert information. In the example of FIG. 6, the operator can designate a parameter to be changed by a pull-down menu in a change parameter designation area 605. In the example of FIG. 6, only the parameter change candidate for changing the feature point extraction parameter is displayed.

After the parameter change candidate is determined, the parameter in the article recognition system is changed to the candidate (S303) and the article recognition system continues processes using the parameter.

<4. Example of Initial Setting>

Figure 7:
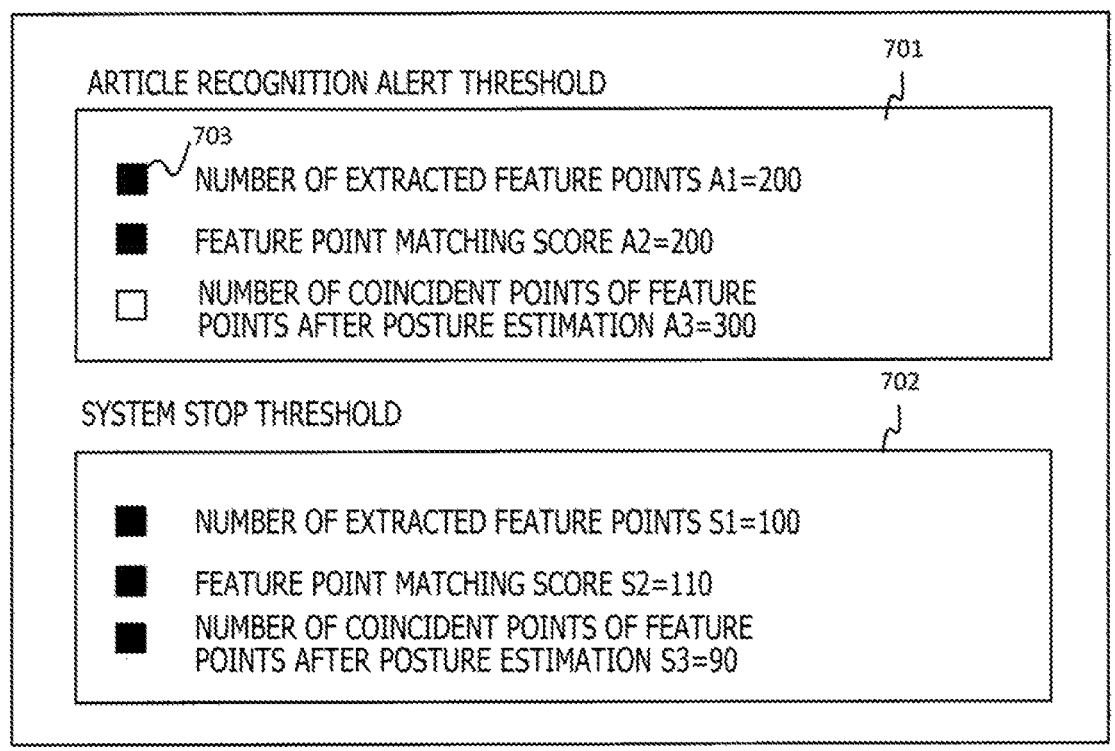
FIG. 7 is a schematic diagram depicting an example of a threshold setting screen in initial setting of the article recognition system.

FIG. 7 depicts an example of a setting screen displayed on the terminal 160 in initial setting before actuating the article recognition system. On this screen, thresholds for application of evaluation of a recognition action and for the evaluation are set.

In an area 701, the alert thresholds used in the determination processes S203, S209, and S212 of FIG. 2 are set. Furthermore, which of the branches is to be applied can be designated in each box 703. In the example of FIG. 7, the determination of S212 is not checked.

In an area 702, the system stop thresholds used in the determination processes S205, S210, and S213 of FIG. 2 are set. Furthermore, which of the branches is to be applied can be designated in each box 703.

FIG. 8 depicts an example of a setting screen displayed on the terminal 160 in the initial setting before actuating the article recognition system. On this screen, the parameter used in the trial in the trial sequence is set.

The parameter used in the trial can be selected by a pull-down menu in each area 801. A trial range is set by, for example, designating a range changed from a current value in each area 802. A granularity of the parameter used in the trial is designated in each area 803. In an example of exposure time of FIG. 8, the trial is performed by dividing a range of plus/minus one second from current exposure time into 100.

In a case of presence of a plurality of parameters, the trial is performed by the number of combinations of the parameters. In the example of FIG. 8, for example, the trial is performed 1,000 times. In an area 804, a predicted value of trial time is displayed. The user can determine a content of each parameter used in the trial in accordance with a use application or circumstances of the system.

As depicted in FIG. 5, the trial sequence can be performed in the background of the ordinary recognition process in the present embodiment. Therefore, setting time necessary for the trial sequence shorter than, for example, time of one picking action makes it possible to present the change parameter candidate to the operator before the next picking. It is, therefore, possible to select an appropriate parameter on the site without substantially stopping the system.

It is noted that the parameters used in the trial may be narrowed down in response to a combination of generated alerts with the parameters used in trial and set on the screen of FIG. 8 assumed as a default. For example, in a case of generation of an alert only in the determination (S213) as to whether the remaining number obtained by adapting the posture of the article in the image to that of the master data 131 and eliminating the deviating feature amounts in FIG. 2, the trial sequence is performed by omitting the trial using the parameter related to the image capturing process S201 and fixing the current image capturing parameter. In this case, the trial sequence may be performed by omitting the trial of the image capturing S201 and using the already captured image.

Second Embodiment

On a site where article recognition is performed, an alert is possibly generated due to a temporary environmental change such as movement of a surrounding person even in a case of no need of parameter change. In such a case, the operator is frequently called, often resulting in a reduction in work efficiency.

To address such circumstances, not evaluating only numeric values at specific points in time but averaging data during predetermined time and evaluating average values in the determination processes S203, S205, S209, S210, S212, and S213 of FIG. 2 enable mitigation of an influence of instantaneous variation in numerical values.

For example, recognition is performed over a plurality of frames of the captured image with respect to the degree of collation or the like between the master data 131 and the measurement data, and an alert is generated when an average of the degrees of collation is below a threshold.

Third Embodiment

In a case in which the degree of collation or the like is reduced and an alert is generated, it is unclear what type of parameter can be used to enable recognition. It is, therefore, ideal to perform the trial with the number of time of changing the parameters set as large as possible. This, however, increases time necessary for the trial sequence.

In the trial sequence S301 of FIG. 5, the trial is performed a plurality of times with the image capturing and the recognitions assumed as a set. However, if the parameter related to the image capturing is fixed, the trial can be performed a plurality of times by changing the parameters associated with the processes other than the image capturing for the image obtained by one image capturing.

Examples of the parameters associated with the processes other than the image capturing include the parameter in the image process, the parameter in the feature point extraction algorithm, the parameter in the feature amount calculation, the parameter in the matching process, the weight parameter for each feature point, and the allowable error threshold in the RANSAC algorithm.

The image capturing can be performed only once, compared with the trial sequence S301 of FIG. 5. Therefore, it is possible to perform the trial sequence at a high speed although the image capturing parameter cannot be changed.

Fourth Embodiment

In FIG. 6 of the first embodiment, a plurality of parameter change options are presented. However, it takes time and labor for the operator to confirm all the options. Furthermore, even in a case of presence of a parameter that is not to be greatly varied on the site from properties of a site environment, experience of a skilled worker, and the like, the other parameters are often displayed with higher priorities given thereto than that to the parameter.

Applying artificial intelligence based on machine learning makes it possible to collect operator's selection results, perform machine learning using the selection results as teacher data, and learn user's selection orientation. It is also possible to rank the parameter change options in response to a learning result and present the ranked options using the learned artificial intelligence.

According to the embodiments described so far, the system has an image capturing section such as the camera, the recognition section, and the recognition evaluation section, the recognition section detects the object to be recognized from the image captured by the image capturing section on the basis of the features of the object to be recognized defined as the master data. On the other hand, the recognition evaluation section calculates the degree of collation indicating the coincident ratio of features of the detected object to be recognized to the features of the object to be recognized defined by the master data, or the like, and alerts the operator in a case in which the degree of collation or the like is below the predetermined threshold. With such a configuration, it is possible to provide the system capable of dynamically changing a countless number of environmental variation factors that are too many to list. Since there is a limit to defining the environmental factors in advance, it is quite effective by giving the operator an opportunity to be able to deal with the variation on the site and to be able to deal with the variation in operation.

What is claimed is:

1. An article recognition system comprising:
   an input section to which a captured image is input;
   an output section that presents information to a user;
   a storage section that stores master data defining features of an object to be recognized;
   a recognition section that detects the object to be recognized in the image on a basis of information extracted from the image and the master data; and
   a recognition evaluation section that evaluates a recognition content of the recognition section and that presents an alert to the output section on a basis of an evaluation result, wherein
   the recognition section collates a feature amount of each of the feature points of the master data to a feature amount of each of the feature points of the object to be recognized in the image such that the feature point of the master data corresponds to the feature point of the object to be recognized in the image,
   the recognition evaluation section presents second warning information as the alert in a case in which the number or a ratio of corresponding feature points by or at which the feature points of the master data correspond to the feature points of the object to be recognized in the image is below a second warning threshold,
   the recognition section performs estimation of a posture of the object to be recognized in the image, eliminates feature points of the object to be recognized in the image if the feature points are apart in position from corresponding feature points of the master data by a predetermined distance or longer, and determines remaining feature points after elimination as coincident points, and
   the recognition evaluation section presents third warning information as the alert in a case in which the number of the coincident points or a ratio of the number of coincident points to the number of the feature points of the master data is below a third warning threshold.

2. The article recognition system according to claim 1, wherein
   the recognition section extracts feature points of the object to be recognized in the image, and
   the recognition evaluation section presents first warning information as the alert in a case in which the number of the extracted feature points or a ratio of the number of the extracted feature points to the number of feature points of the master data is below a first warning threshold.

3. The article recognition system according to claim 2, wherein
   the recognition evaluation section instructs the system to perform a predetermined action in a case in which the number of the extracted feature points or a ratio of the number of the extracted feature points to the number of feature points of the master data is below a first stop threshold smaller than the first warning threshold.

4. The article recognition system according to claim 1, wherein
   the recognition evaluation section instructs the system to perform a predetermined action in a case in which the number or ratio of corresponding feature points by or at which the feature points of the master data correspond to the feature points of the object to be recognized in the image is below a second stop threshold smaller than the second warning threshold.

5. The article recognition system according to claim 1, wherein
   the recognition evaluation section instructs the system to perform a predetermined action in a case in which the number of the coincident points or the ratio of the number of coincident points to the number of the feature points of the master data is below a third stop threshold smaller than the third warning threshold.

6. The article recognition system according to claim 1, comprising:
   a parameter adjustment section, wherein
   the recognition evaluation section evaluates the recognition content of the recognition section, and presents the alert to the output section and instructs the parameter adjustment section to make parameter adjustment on the basis of the evaluation result, and
   the parameter adjustment section
      changes at least one of an image capturing parameter for capturing the image, an image processing parameter for processing the captured image, and a parameter used in a process performed by the recognition section,
      performs a trial sequence for causing the recognition section to detect the object to be recognized in the image using the changed parameter, and for causing the recognition evaluation section to evaluate the recognition content of the recognition section, and presents a change parameter candidate on a basis of an evaluation result of the recognition content by the recognition evaluation section.

7. The article recognition system according to claim 6, wherein
the parameter adjustment section presents the evaluation result of the recognition content by the recognition evaluation section at a time of presenting the change parameter candidate to the output section on the basis of the evaluation result of the recognition content by the recognition evaluation section.

8. The article recognition system according to claim 7, wherein
the user may change a presentation condition or a presentation method of the change parameter candidate at a time of presenting the change parameter candidate to the output section on the basis of the evaluation result of the recognition content by the recognition evaluation section.

9. The article recognition system according to claim 6, comprising:
a mechanical system control section, wherein
the mechanical system control section controls a mechanical system that mechanically operates the object to be recognized in the image after the recognition section detects the object to be recognized, and
the parameter adjustment section performs the trial sequence in parallel to control over the mechanical system.

10. The article recognition system according to claim 9, wherein
time necessary for the trial sequence is presented to the output section, and the user may change at least one of the number of parameters changed in the trial sequence and a content of the parameters.

11. An article recognition method for storing features and placement of an object to be recognized as master data and detecting the object to be recognized in an image, the method comprising:

a first step of inputting a captured image of an article;
a second step of extracting features from the image and detecting an article corresponding to the features and the placement of the master data at a degree of collation equal to or higher than a predetermined value from the image;
a third step of determining whether the degree of collation is below a stop threshold in the second step;
a fourth step of determining whether the degree of collation is below an alert threshold greater than the stop threshold in the second step;
a fifth step of changing a parameter used in the second step and trying the second step in a case in which it is determined in the fourth step that the degree of collation is below the alert threshold;
a sixth step of evaluating the degree of collation as a result of trying the second step by the fifth step; and
a seventh step of presenting an evaluation result by the sixth step to a user,
wherein the second step includes extracting feature points in the image, collating a feature amount of each of feature points of the master data to a feature amount of each of the feature points of the object to be recognized in the image, performing estimation of a posture of the object to be recognized in the image, eliminating feature points of the object to be recognized in the image if the feature points are apart in position from corresponding feature points of the master data by a predetermined distance or longer, and calculating the degree of collation on a basis of remaining feature points after elimination.

12. The article recognition method according to claim 11, wherein
the first to fourth steps are executed continuously unless it is determined in the third step that the degree of collation is below the stop threshold, and the fifth to seventh steps are executed in a background of the first to fourth steps.

* * * * *